(12) United States Patent
Weinhold

(10) Patent No.: US 7,662,081 B2
(45) Date of Patent: *Feb. 16, 2010

(54) APPARATUS, COMPOSITION, AND METHODS TO REMEDIATE AN ACID AND/OR LIQUID SPILL

(75) Inventor: Dennis Weinhold, Phoenix, AZ (US)

(73) Assignee: Phase III, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/999,452

(22) Filed: Dec. 4, 2007
(Under 37 CFR 1.47)

(65) Prior Publication Data

US 2009/0012344 A1 Jan. 8, 2009

Related U.S. Application Data

(60) Provisional application No. 60/868,495, filed on Dec. 4, 2006.

(51) Int. Cl.
*B09B 1/00* (2006.01)
(52) U.S. Cl. ............................ 588/255; 588/315; 134/7
(58) Field of Classification Search ................ 588/252, 588/255, 315; 134/7
See application file for complete search history.

(56) References Cited

U.S. PATENT DOCUMENTS

| | | | |
|---|---|---|---|
| 2,596,046 A | 5/1952 | Roth | |
| 2,664,950 A | 7/1954 | Rivers et al. | |
| 3,419,430 A | 12/1968 | Michaels | |
| 3,765,950 A * | 10/1973 | Lauck | 429/303 |
| 5,342,543 A * | 8/1994 | Morris et al. | 252/190 |
| 6,361,768 B1 * | 3/2002 | Galleguillos et al. | 424/70.12 |
| 2008/0233069 A1 * | 9/2008 | Tamareselvy et al. | 424/70.11 |

OTHER PUBLICATIONS

Ansul, "Spill Control Applicators", Spill-Gun®, 2000, Form No. SC-8648-3, Ansul Incorporated, USA.
Ansul, Spill-X-A® Material Safety Data Sheet, Form No. SC-8667-13, Ansul Incorporated, USA.

* cited by examiner

*Primary Examiner*—John Kreck
(74) *Attorney, Agent, or Firm*—Dale F. Regelman; Quarles & Brady LLP

(57) ABSTRACT

A method to remediate a release of one or more acidic materials, by supplying a powder composition comprising a polyacrylamide, and disposing that powder onto a liquid spill comprising one or more acidic materials.

4 Claims, 2 Drawing Sheets

APPARATUS, COMPOSITION, AND METHODS TO REMEDIATE AN ACID AND/OR LIQUID SPILL

CROSS-REFERENCE TO RELATED APPLICATIONS

This application claims priority from a U.S. Provisional Application having Ser. No. 60/868,495, filed on Dec. 4, 2006.

FIELD OF THE INVENTION

The invention relates to an apparatus and method to remediate a liquid spill. In certain embodiments, the invention relates to an apparatus and method to remediate an acid spill. In certain embodiments, the invention relates to an apparatus and method to remediate a caustic spill.

BACKGROUND OF THE INVENTION

The release of large amounts of a liquid acid creates an emergent situation. The released acid may be highly corrosive. In addition, that release acid may off-gas one or more toxic gases. An initial response to a release of a large quantity of a liquid acid includes steps to neutralize the acid to form a less corrosive material. Subsequent remediation steps include containerizing the neutralized reaction mixture.

Neutralizing a large amount of acid, such as for example sulfuric acid, with a large amount of a caustic, such as for example potassium hydroxide, sodium hydroxide, and the like, produces a highly exothermic reaction which liberates a tremendous quantity of heat. Such an instantaneous release of thermal energy may result in vaporization of portions of the spilled acid, part or all of the added caustic, and/or liberate one or more toxic gases such as for example various oxides of sulfur. Such a response to a release of sulfuric acid may in fact create a more hazardous situation than the original release. Similarly, neutralizing a large amount of sulfuric acid with an organic amine can similarly liberate thermal energy resulting in the vaporization of toxic organic compounds as well as various sulfur oxides.

What is needed is a method to respond to a release of one or more liquid acids, wherein that response neutralizes the spilled acid, and wherein that response also containerizes the neutralized reaction products to facilitate removal of those reaction products from the environment.

SUMMARY OF THE INVENTION

Applicant's invention comprises an apparatus and a method to remediate a release of one or more acidic materials. The method supplies a powder composition comprising a polyacrylamide, and disposed that powder onto a liquid spill comprising one or more acidic materials. In certain embodiments, the polyacrylamide comprising a cross-linked polyacrylamide. In certain embodiments, the polyacrylamide comprises a copolymer polyacrylamide-co-polyacrylic acid. In certain embodiments, the polyacrylamide comprises a cross-linked terpolymer formed from acrylamide, acrylic acid, and N,N'-methylene bisacrylamide.

BRIEF DESCRIPTION OF THE DRAWINGS

The invention will be better understood from reading the following detailed description taken in conjunction with the drawings in which like reference designators are used to designate like elements, and in which.

DETAILED DESCRIPTION OF THE PREFERRED EMBODIMENTS

Figure 1:
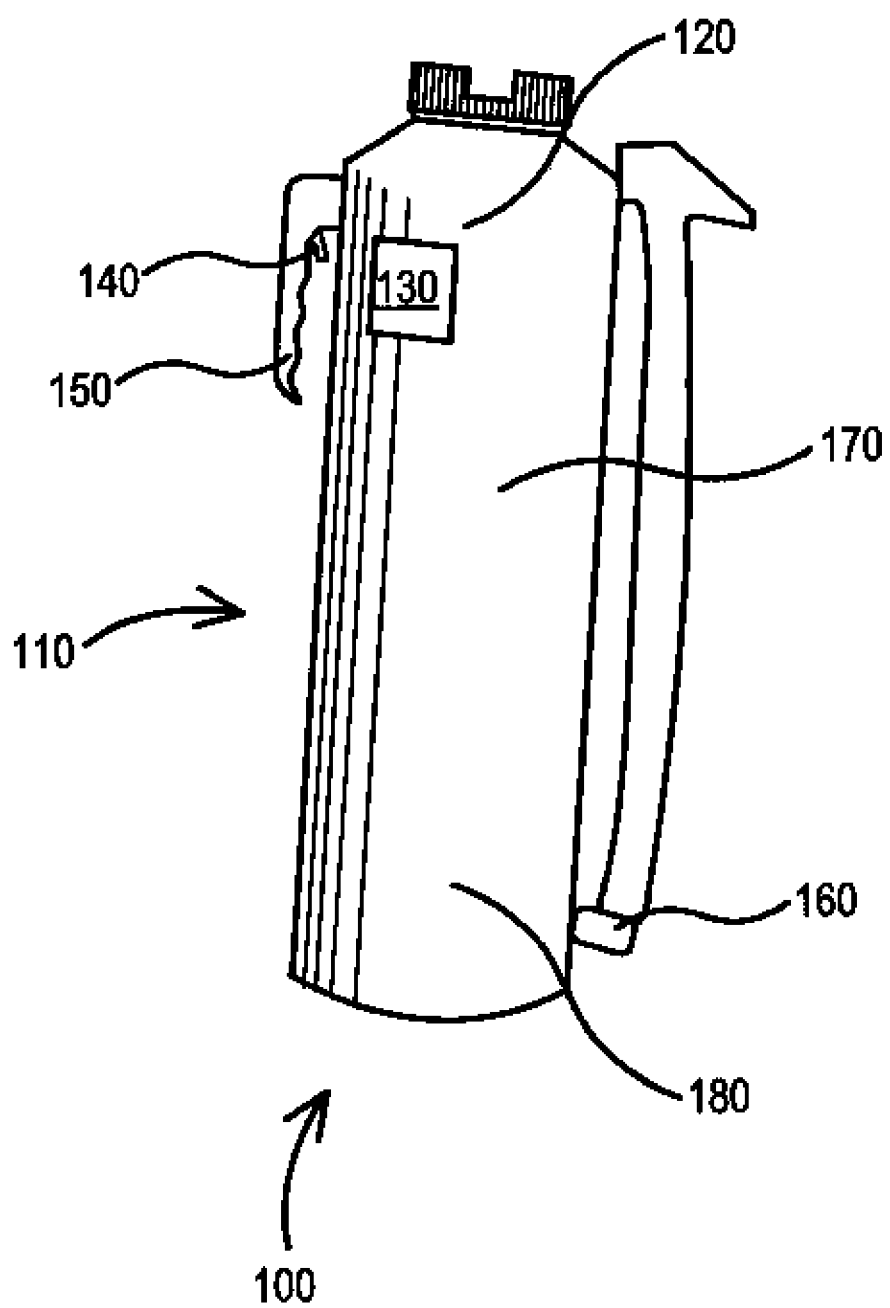
FIG. 1 shows Applicant's first powder dispenser used to dispense Applicant's powdered liquid spill remediation formulation onto a spill.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicant's invention is described herein in embodiments directed to the remediation of a release of sulfuric acid. This description of Applicant's invention should not, however, be interpreted to mean that the invention is limited to the remediation of sulfuric acid spills. Rather, Applicant's invention can be used to respond to the release of one or more acid materials, one or more basic materials, and/or one or more liquids in general.

Applicant's invention comprises an apparatus and a method using that apparatus to remediate the release of one or more acidic materials. By "release," Applicants incorporate the definition of "release" used in the federal Comprehensive Environmental Response, Compensation, and Liability Act ("CERCLA") sometimes referred to the Superfund Act. See, 42 U.S.C. § 9601 et seq. More specifically, for purposes of this application "release" means any spilling, leaking, pumping, pouring, emitting, emptying, discharging, injecting, escaping, leaching, dumping, or disposing into the environment (including the abandonment or discarding of barrels, containers, and other closed receptacles).

As those skilled in the art will appreciate, the release of large amounts of a liquid acid creates an emergent situation. The released acid may be highly corrosive. In addition, that release acid may off-gas one or more toxic gases. As those skilled in the art will further appreciate, the initial response to a release of a large quantity of a liquid acid includes steps to neutralize the acid to form a less corrosive material. Subsequent remediation steps include containerizing the neutralized reaction mixture.

As those skilled in the art will further appreciate, neutralizing a large amount of sulfuric acid with a large amount of a base, such as for example potassium hydroxide, sodium hydroxide, and the like, produces a highly exothermic reaction which liberates a tremendous quantity of heat. Such an instantaneous release of thermal energy may result in vaporization of portions of the spilled acid, and liberate one or more toxic gases such as for example various oxides of sulfur. Such a response to a release of sulfuric acid may in fact create a more hazardous situation than the original release. Similarly, neutralizing a large amount of sulfuric acid with an organic amine can similarly liberate thermal energy resulting in the vaporization of toxic organic compounds as well as various sulfur oxides.

What is needed is a method to respond to a release of one or more liquid acids, wherein that response neutralizes the spilled acid, and wherein that response also containerizes the neutralized reaction products to facilitate removal of those reaction products from the environment. Applicant's apparatus and method provides such a system.

In certain embodiments, Applicant's method comprises distributing a powder composition comprising polyacrylamide ("PAA") I onto an acid spill. In certain embodiments, the weight average molecular weight of the PAA used in Applicant's acid spill remediation formulation is between about 10,000 Daltons and about 10,000,000 Daltons.

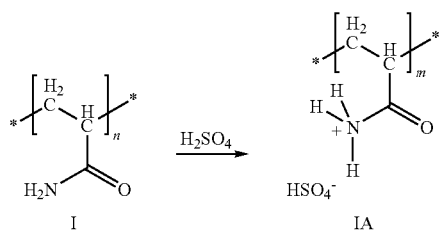

In certain embodiments, Applicant's acid spill remediation formulation comprises one or more cross-linked acrylamide materials. For example and without limitation, in certain embodiments Applicant's acid spill remediation formulation comprises a cross-linked polyacrylamide VIII formed from the copolymerization of acrylamide II and N,N'-methylene bisacrylamide III. In certain embodiments, the mole ratio of acrylamide II to bisacrylamide III is between about 1:10 to about 1:1000.

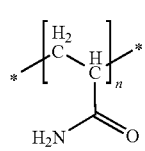

PAA I is formed by the polymerization of acrylamide II.

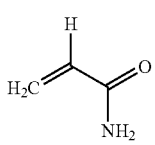

Compared to amines, amides are very weak bases. While the conjugate acid of an amine has a pKa of about 9.5, the conjugate acid of an amide has a pKa around −0.5. Each molecule of PAA comprises hundreds to thousands of pendent amide groups. This being the case, application of Applicant's powdered acid spill remediation formulation to a release of sulfuric acid provides thousands to millions of weakly basic amide groups to neutralize the released acid in a controlled way that does not result in an instantaneous liberate of large quantities of thermal energy. As shown below, PAA I, wherein n is between about 100 and about 1,000,000, controllably reacts with Sulfuric Acid to produce salt IA, wherein m is between about 100 and about 1,000,000, thereby neutralizing the Sulfuric Acid.

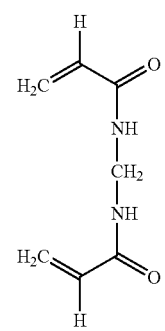

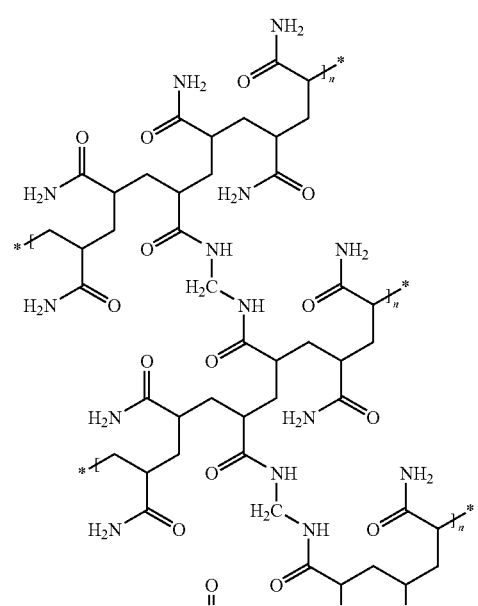

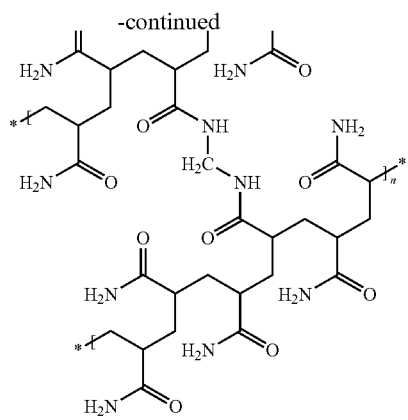

wherein n is between about 100 and about 1,000,000.

Applicant has found that cross-linked polyacrylamide resins VIII formed from acrylamide II and bisacrylamide III are highly water-absorbent, and form gels when dispersed onto a quantity of sulfuric acid. As those skilled in the art will appreciate, a gel comprises a colloidal system wherein a porous network of interconnected nanoparticles spans the volume of a liquid medium.

Distribution of PAA I, and/or a cross-linked PAA formed by copolymerizing acrylamide II and bisacrylamide III, onto a quantity of sulfuric acid neutralizes that acid with a diminimus liberation heat to form an intact gel material that can be easily handled using, for example and without limitation, a shovel, a broom, and the like.

The following example is presented to further illustrate to persons skilled in the art how to make and use the invention. This example is not intended as a limitation, however, upon the scope of the invention.

EXAMPLE I

About 8 grams of a powder comprising a cross-linked polyacrylamide material sold in commerce by Petroleum Environmental Technology, Inc. under the tradename Enviro-Bond 300 was disposed onto about 20 grams of 96.2% sulfuric acid at (63° F.) room temperature. The temperature rose to a maximum of about 140° F. as the sulfuric acid reacted with, and was neutralized by, the polyacrylamide. After about 55 seconds, an intact gel was formed, wherein that gel could be manipulated in tact, and could be handled using a spatula, spoon, tongs, and the like, and wherein there was no residual liquid material of any kind. That gel was then packaged, i.e. containerized, for proper waste disposal.

In certain embodiments, Applicant's invention further comprises a more general liquid release remediation formulation comprising a copolymer VII comprising both acrylamide repeat units V and acrylic acid repeat units VI, wherein n is between about 100 to about 1,000,000, and wherein p is about 100 to about 1,000,000, and wherein the ratio of n to p is between about 1:10 to about 10:1.

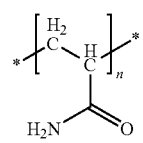

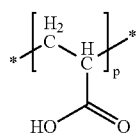

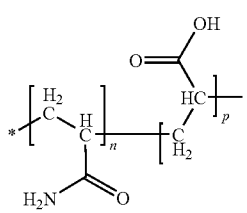

As those skilled in the art will appreciate, co-polymer VII is formed by the co-polymerization of acrylamide and acrylic acid IX.

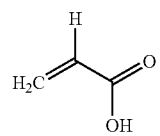

In certain embodiments, the co-polymer VII comprises blocks of polyacrylamide and blocks of polyacrylic acid. In other embodiments, co-polymer VIII comprises a random arrangement of pendant amide containing units and pendant acid containing units.

In certain embodiments, Applicant's liquid release remediation formulation comprises a cross-linked ter-polymer X comprising repeat units V and VI and also cross-link units formed from bis-acrylamide III.

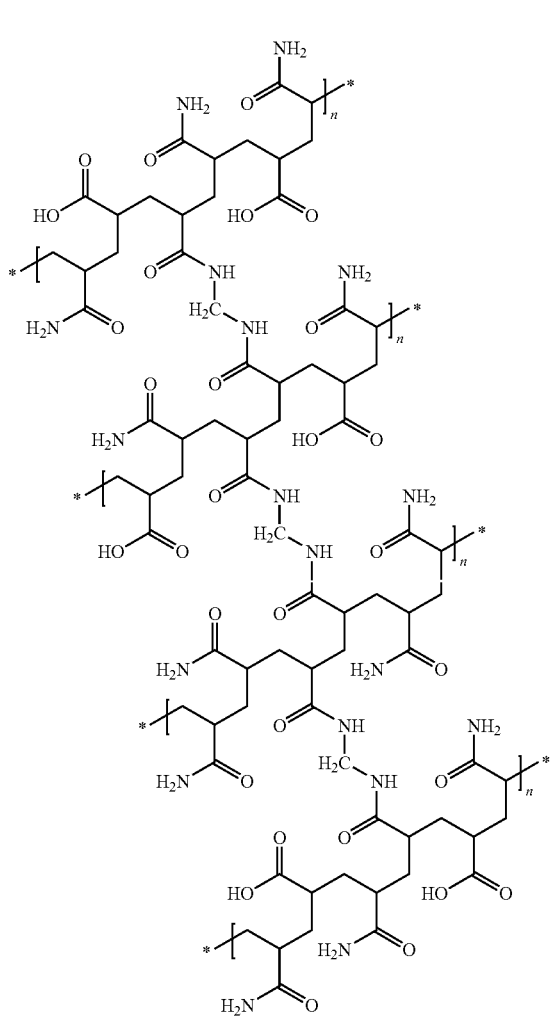

In these pendant amide/pendant acid co-polymer/ter-polymer formulations, one or more pendant amide groups may be used to neutralize acids to form one or more pendant amidonium groups.

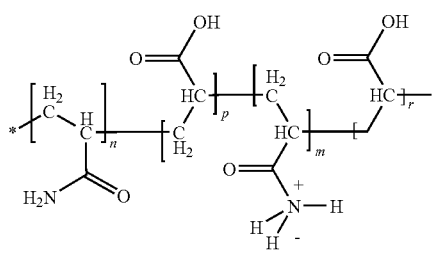

VIIA

In addition and as shown below, one or more of the pendent acid groups of repeat units VI can be used to neutralize bases, such as in general a base M-OH, wherein M can be for example potassium, sodium, magnesium, and the like. Thus, co-polymer VII and/or ter-polymer X can be used to remediate a release, i.e. a spill, of one or more liquid caustic materials.

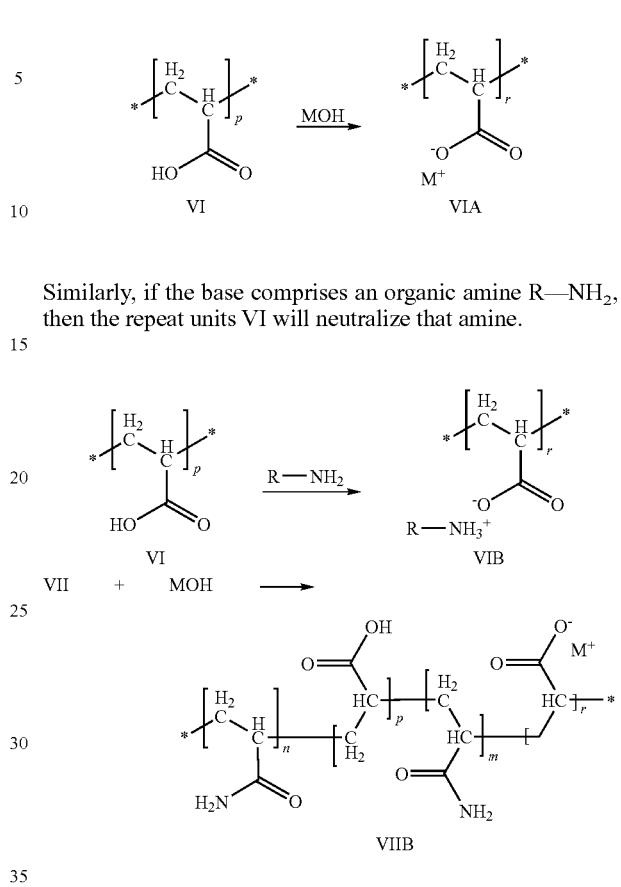

Similarly, if the base comprises an organic amine $R-NH_2$, then the repeat units VI will neutralize that amine.

Thus, Applicant's liquid release remediation formulation comprising a cross-linked co-polymer, and/or ter-polymer, comprising repeat units V and VI may be used to handle any spill of a liquid material. If the released liquid comprises an acid, then the repeat units V will neutralize the acid groups. If the released liquid comprises a base, then the repeat units VI will neutralize the basic groups. Furthermore, if the liquid comprise an aqueous material, then that aqueous material will not only be neutralized, the liquid will form an intact gel that can be easily removed from the environment.

In certain embodiments, Applicant's invention further comprises PAA I, and/or cross-linked PAA IX, and/or co-polymer VII, and/or cross-linked co-polymer X, (each a "Powdered Liquid Spill Remediation Formulation") disposed in a delivery device, i.e. a powder dispenser, comprising a reservoir containing the one or more polymeric materials, a source of one or more pressurized propellant gases in communication with the reservoir, an actuator mechanism interconnected with the source of pressurized propellant gas(es), and a discharge nozzle in communication with the reservoir. For example and referring now to FIG. 1, apparatus 100 comprises reservoir 110, Applicant's Powdered Liquid Spill Remediation Formulation disposed within reservoir 110, container 120, one or more pressurized propellant gases 130 releasably disposed within container 120, actuator 140, handle 150, and discharge nozzle 160.

Apparatus 100 can be hand-carried to the site of an acid release/liquid release. Discharge nozzle 160 is directed toward the released material(s). Actuator 140 is actuated releasing the one or more propellant gases 130 into the reservoir portion. Propellant gases 130 cause Powdered Liquid Spill Remediation Formulation to be dispensed outwardly from discharge nozzle 160 and onto the released acid/liquid.

Figure 2:
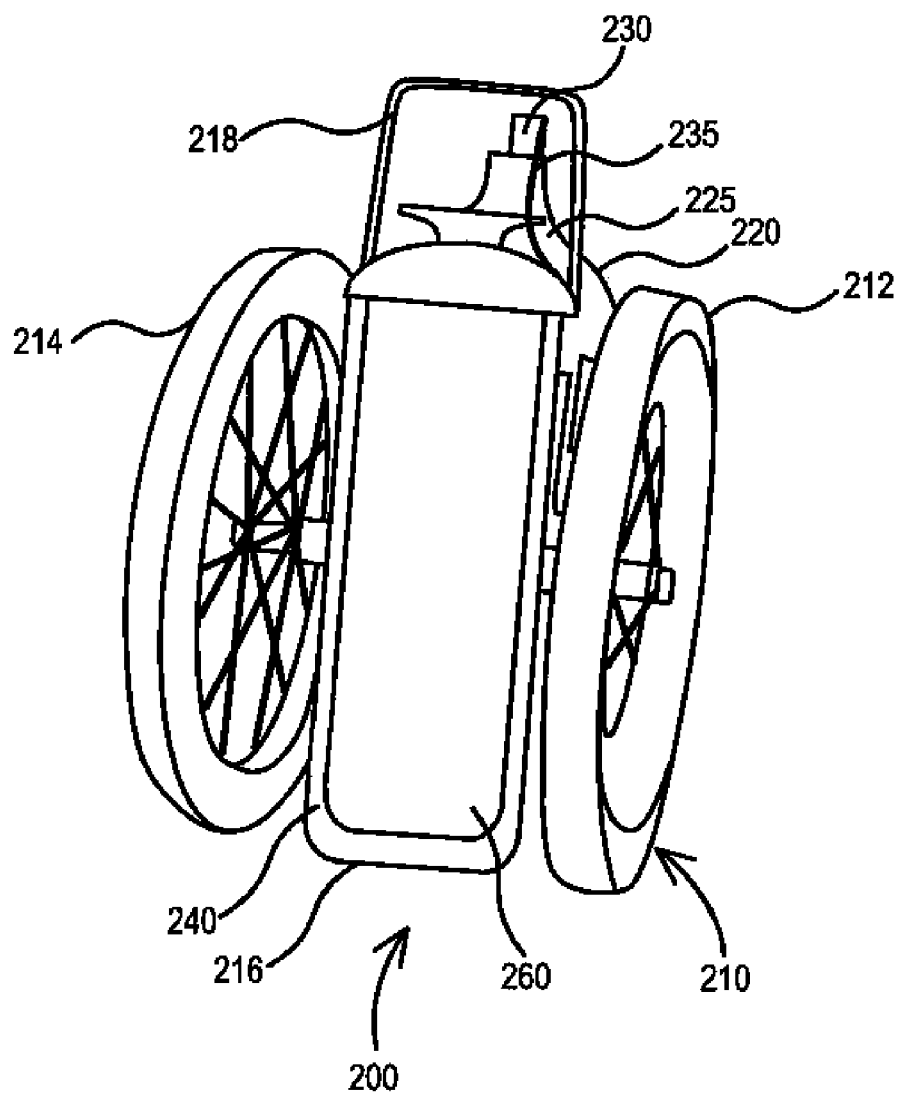
FIG. 2 shows Applicant's second first powder dispenser used to dispense Applicant's powdered liquid spill remediation formulation onto a spill.

Referring to FIG. 2, apparatus 200 comprises a wheeled cart 210 comprising wheels 212 and 214, cart portion 216, handle 218, and reservoir 240. One or more pressurized propellant gases 225 are releasably disposed within cylinder 220. Conduit 235 interconnects cylinder 220 and reservoir 240. Applicant's Powdered Liquid Spill Remediation Formulation is disposed within reservoir 240.

Apparatus 200 can be moved to the site of an acid release/liquid release. Valve 230 is opened thereby releasing the one or more pressurized propellant gases 225 into reservoir 240 causing Powdered Liquid Spill Remediation Formulation to be dispensed outwardly from a discharge nozzle in communication with reservoir 240 and onto the released acid/liquid.

While the preferred embodiments of the present invention have been illustrated in detail, it should be apparent that modifications and adaptations to those embodiments may occur to one skilled in the art without departing from the scope of the present invention.

I claim:

1. A method to remediate the release of caustic materials or acidic materials, comprising the steps of:
  supplying poly(acrylic acid-co-acrylamide);
  disposing said poly(acrylic acid-co-acrylamide) onto a liquid spill comprising caustic materials or acidic materials.

2. The method of claim 1, further comprising the steps of:
  operative if said liquid spill comprises caustic materials:
  reacting said caustic materials with said poly(acrylic acid-co-acrylamide) to form a pendent acrylate salt; and
  packaging said polyacrylate salt for disposal;
  operative if said liquid spill comprises acidic materials:
  reacting said acidic materials with said poly(acrylic acid-co-acrylamide)to form a pendent acrylammonium salt; and
  packaging said polyacrylammonium salt for disposal.

3. The method of claim 1 wherein said polyacrylic acid is formed by the co-polymerization of acrylamide having the structure:

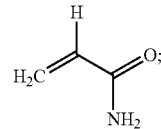

and acrylic acid having the structure:

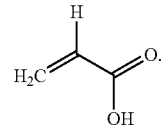

4. The method of claim 3, wherein the ratio of acrylamide to acrylic acid is between 1:10 to 10:1.

* * * * *